US006624991B2

(12) United States Patent
Chu

(10) Patent No.: US 6,624,991 B2
(45) Date of Patent: Sep. 23, 2003

(54) CIRCUIT BREAKER

(75) Inventor: Raymond Wai Hang Chu, Chai Wan (HK)

(73) Assignee: Defond Manufacturing Limited, Chai Wan (HK)

(*) Notice: Subject to any disclaimer, the term of this patent is extended or adjusted under 35 U.S.C. 154(b) by 25 days.

(21) Appl. No.: 09/939,794

(22) Filed: Aug. 28, 2001

(65) Prior Publication Data

US 2003/0043004 A1 Mar. 6, 2003

(51) Int. Cl.[7] .......................... H01H 73/00; H02H 9/08

(52) U.S. Cl. .......................... 361/42; 361/115; 361/42

(58) Field of Search .......................... 361/115, 42, 45–50, 361/72

(56) References Cited

U.S. PATENT DOCUMENTS 4,086,643 A * 4/1978 Jacobs .......................... 361/92
5,301,083 A * 4/1994 Grass et al. .......................... 361/64
5,933,306 A * 8/1999 Santos et al. .......................... 361/45
5,943,199 A * 8/1999 Aromin .......................... 361/42
6,150,940 A * 11/2000 Chapman et al. .......... 340/568.3
6,477,022 B1 * 11/2002 Ennis et al. .......................... 361/42
2002/0105771 A1 * 8/2002 Simms et al. .................. 361/115
2002/0135958 A1 * 9/2002 Germain et al. .................. 361/42

* cited by examiner

*Primary Examiner*—Gregory J. Toatley, Jr.
*Assistant Examiner*—Danny Nguyen
(74) *Attorney, Agent, or Firm*—Leydig, Voit & Mayer, Ltd.

(57) ABSTRACT

A circuit breaker includes two movable contacts for electrical connection to a load and a power source, respectively, a movable contact holder holding the first contact, a first spring biassing the contact holder, and an actuator for moving the second contact into contact with the first contact. A locking frame locks the contact holder and, in turn, the first contact at a first position in the path of movement of the second contact, against the spring, for contact by the second contact. The locking frame pivots between a first locking position locking the contact holder in the first position and a second position releasing the contact holder from the first position. A second spring biasses the locking frame towards the second position. A solenoid holds the locking frame in the first position against the second spring. An electronic control circuit detects occurrence of a circuit fault and, in response to detecting a fault, disables the solenoid.

14 Claims, 5 Drawing Sheets

CIRCUIT BREAKER

BACKGROUND OF THE INVENTION

For safety reasons, circuit breakers are often used between an electrical appliance and the mains power source. In one typical construction, the circuit breaker has at least one pair of internal contacts for switching the electrical connection between the load and the power source, and includes an actuator for moving one of the contacts into contact with the other contact. A solenoid is operable to hold the two contacts together. An electronic control circuit is further included to detect the occurrence of a circuit fault and, in response to a fault, to disable the operation of the solenoid, thereby allowing the two contacts to separate.

The invention seeks to provide a circuit breaker of this type in general, having a novel construction.

SUMMARY OF THE INVENTION

According to a first aspect of the invention, there is provided a circuit breaker for use between a load and a power source, comprising a casing, at least two movable contacts inside the casing for electrical connection to said load and power source respectively, a movable contact holder holding a first of said at least two contacts, first resilient means biassing the contact holder to move, and an actuator arranged to move a second of said at least two contacts into contact with the first contact. A locking member is arranged to lock the contact holder and in turn the first contact at a specific position into the path of movement of the second contact, against the action of the first resilient means, for contact by the second contact. The locking member is supported for movement between a first position locking the contact holder in said specific position and a second position releasing the contact holder from said specific position. Second resilient means biasses the locking member towards the second position. An electromagnetic device is operable to hold the locking member in the first position against the action of the second resilient means. An electronic control circuit is adapted to detect the occurrence of a circuit fault and in response to disable the operation of the electromagnetic device.

Preferably, the first and second resilient means comprise separate springs.

In a preferred embodiment, the circuit breaker includes third resilient means biassing the actuator to move the second contact into contact with the first contact.

More preferably, the actuator has a part engaging the contact holder in one direction to limit the movement of the contact holder by the first resilient means in the opposite direction and to move the contact holder simultaneously in said one direction in a spaced apart relationship against the action of both the first and the third resiliently means.

It is preferred that the first contact is carried by the contact holder for movement thereby.

It is preferred that the second contact is carried by the actuator for movement thereby.

Preferably, the contact holder and the actuator are moveable along substantially parallel axes, and the electromagnetic device has a central axis that is substantially parallel to the axes of the contact holder and the actuator.

Preferably, the electromagnetic device comprises a solenoid and a ferromagnetic core and is operable to hold the locking member in the first position by way of magnetic attraction.

In a specific construction, the locking member is supported for pivotal movement, and comprises a first planar member adjacent the contact holder and a second planar member adjacent the electromagnetic device, said two planar members being connected substantially perpendicularly together.

More specifically, the contact holder includes a protrusion on one side, and the first planar member includes a detent on the same side for engaging the protrusion and thus detaining the contact holder at said specific position.

More specifically, the second planar member has a free end supporting a member which is susceptible to magnetic attraction by the electromagnetic device.

In a preferred embodiment, the circuit breaker includes two said first contacts and two said second contacts, wherein each pair of one first contact and one second contact is provided on a respective left/right side of the casing, said one first contact and one second contact being for electrical connection in a respective live/neutral circuit to said load and power source respectively.

The casing may be in the form of a power plug having power pins for insertion into a socket of said power source and including a rear opening to permit the entrance of a power cord connected to said load.

According to a second aspect of the invention, there is provided a circuit breaker for use between a load and a power source, comprising a casing, at least two movable contacts inside the casing for electrical connection to said load and power source respectively, and a movable contact holder holding a first of said at least two contacts. A resiliently biassed actuator is arranged to move against the action of resilience both said at least two contacts in a spaced part relationship in one direction and subsequently to move under the action of resilience a second of said at least two contacts in the opposite direction into contact with the first contact. A movable locking member is arranged to stop movement of the first contact in said opposite direction for contact by the second contact. An electromagnetic device is operable to hold the locking member in a position stopping movement of the first contact in said opposite direction. An electronic control circuit is adapted to detect the occurrence of a circuit fault and in response to disable the operation of the electromagnetic device.

BRIEF DESCRIPTION OF THE INVENTION

The invention will now be more particularly described, by way of example only, with reference to the accompanying drawings, in which.

DETAILED DESCRIPTION OF PREFERRED EMBODIMENT

Figure 1:
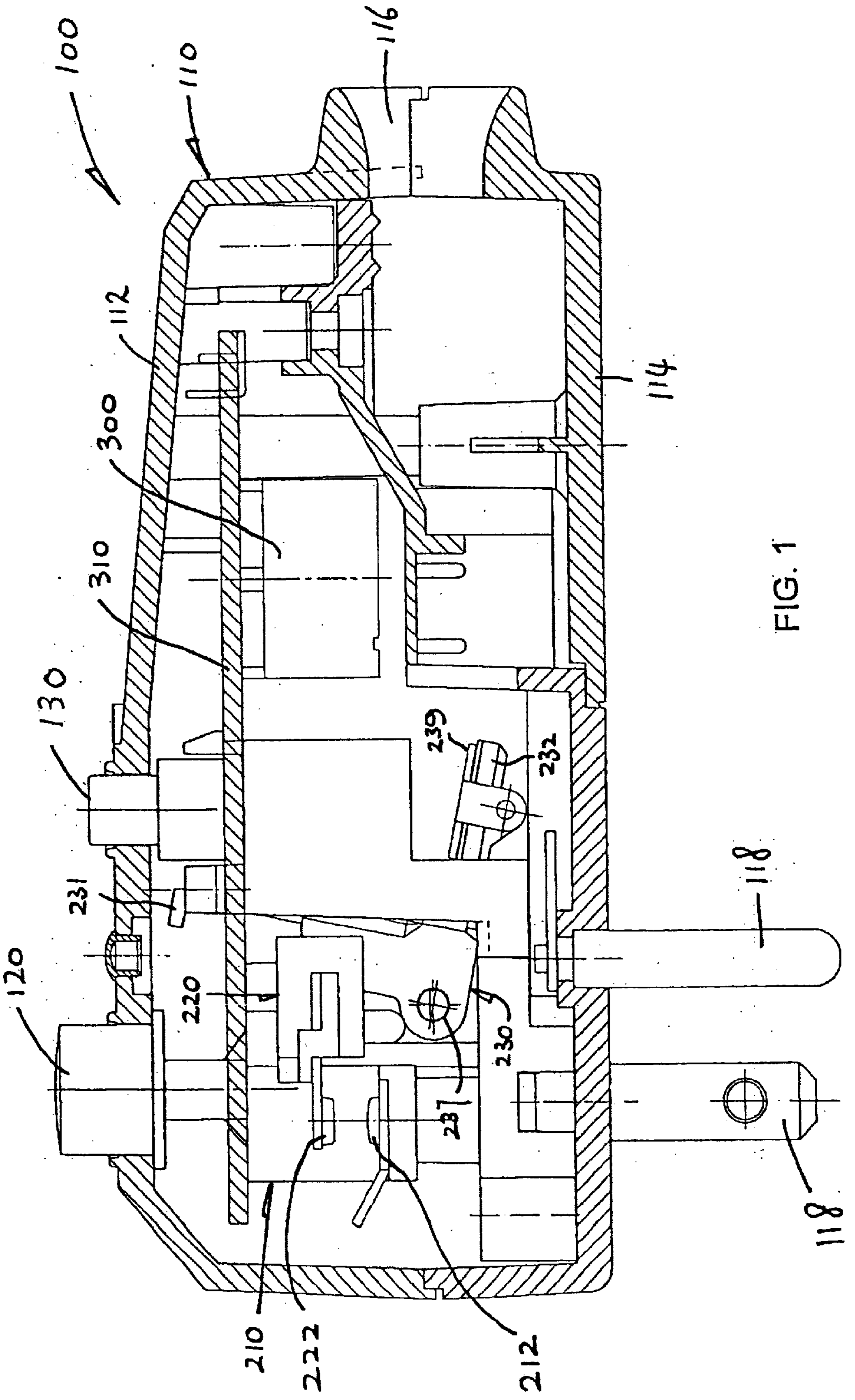
FIG. 1 is a cross-sectional side view of an embodiment of a circuit breaker in accordance with the invention.

Referring to the drawings, there is shown a circuit breaker 100 embodying the invention, which circuit breaker 100 has a casing 110 in the form of a power plug formed by upper and lower parts 112 and 114 and having a set of live, neutral and earth power pins 118 projecting from the lower casing part 114 for insertion into a mains power supply socket. The casing 110 includes at its rear end an opening 116 to permit the entrance of a power cord that is connected at its remote end to a load such as an electrical appliance. The circuit breaker 100 includes an internal switching mechanism 200, reset and test buttons 120 and 130 on the upper casing part 112, and an internal electronic control circuit 300 for detecting the occurrence of a circuit fault, such as a ground fault occurring at the load *.

A printed circuit board 310 extends horizontally within the upper casing part 112, which has upper and lower sides on which the reset and test buttons 120 and 130 are located and the control circuit 300 is mounted, respectively. The circuit board 310 also supports on its lower side the switching mechanism 200.

The switching mechanism 200 comprises the following components which are disposed symmetrically and sequentially along a central longitudinal axis of the casing 110: an actuator 210 carrying on its opposite sides a pair of left and right lower contacts 212, a contact holder 220 carrying on its opposite sides a pair of left and right upper contacts 222 in vertical alignment with the lower contacts 212, a locking frame 230 for locking the upper and lower contacts 222 and 212 on each side in mutual contact, and an electromagnetic device such as a solenoid 240 electrically connected to the control circuit 300. The upper and lower contacts 222 and 212 on each side are electrically connected to the live/neutral power pin 118 and the live/neutral cable of the power cord respectively, or vice versa, and act as an on/off switch in that live/neutral circuit for the load.

The actuator 210 is slidable along a vertical axis and is resiliently biased upwards by a first compression coil spring 214. The contact holder 220 is slidable along an adjacent vertical axis and is resiliently biased upwards by a second compression coil spring 224. The actuator 210 has a vertical top shaft 216 engaging the reset button 120 from below. Upon depression, the reset button 120 will move the actuator 210 downwards against the action of the first spring 214.

The actuator 210 includes a horizontal upper plate 218 which projects rearwards over and for engaging the contact holder 220 from above, counteracting the action of the second spring 224. As the reset button 120 is depressed, and while the contact holder 220 and the plate 218 are interengaged, the actuator 210 will move the contact holder 220 simultaneously downwards against the action of both springs 214 and 224, during which time the lower and upper contacts 212 and 222 on each side are kept in a spaced apart relationship.

The contact holder 220 has a pair of aligned left and right protruding side knobs 226 that are oblong in shape and are oriented vertically.

The locking frame 230 has a generally L-shaped body comprising a vertical plate 231 and a horizontal plate 232 extending rearwards from the vertical plate 231. The vertical plate 231 has on its outer, front surface a pair of opposed left and right side walls 233 which together define a vertical channel embracing part of the contact holder 220 from behind. Each side wall 233 has a front edge portion including a flat recess 234 forming a pair of opposed upper and lower protrusions 235 and 236 above and below the recess 234. Each protrusion 235/236 has an inner edge that is outwardly inclined. The locking frame 230 is arranged such that while it is in an upright position (FIGS. 3B/4B), its recesses 234 catch respective side knobs 226 of the contact holder 220, thereby locking the contact holder 220 in a lowermost position (FIGS. 3B/4B) against the action of the spring 224.

Figure 2B:
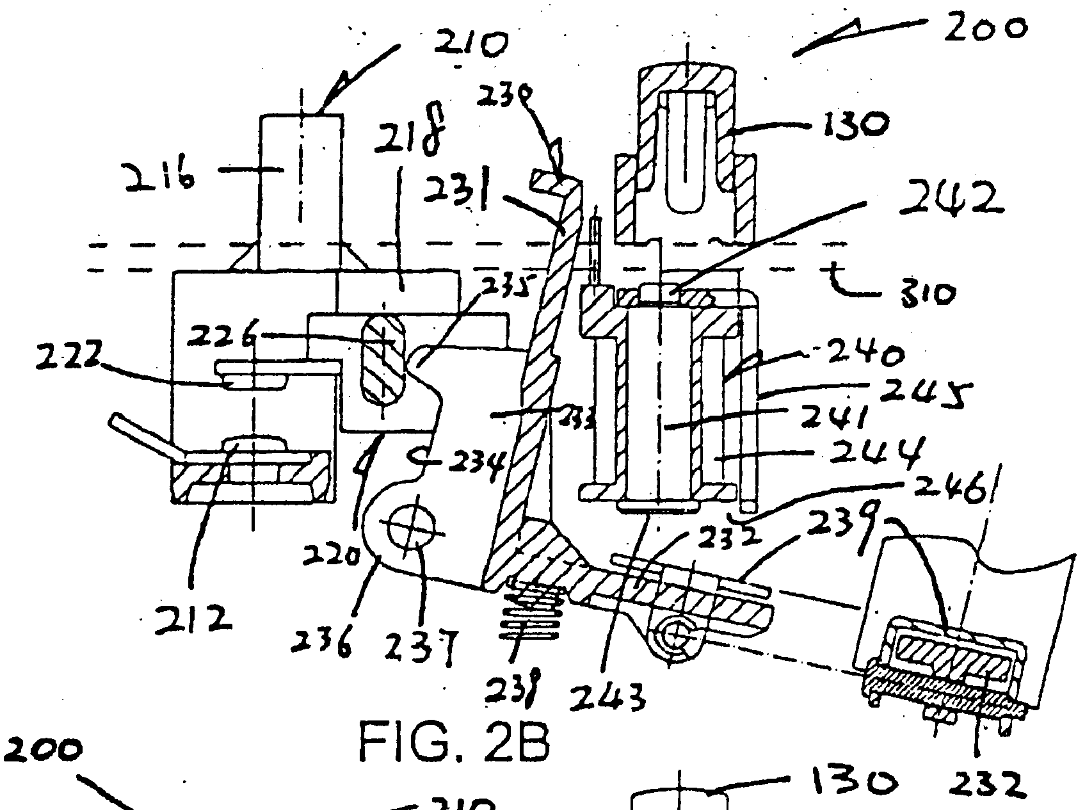
FIGS. 2A and 2B are a side view and a partially cross-sectioned side view of an internal switching mechanism of the circuit breaker of FIG. 1, the mechanism being in an initial or tripped condition.

The locking frame 230 is supported by means of a hinge 237 at its lower protrusions 236 for pivotal movement about a horizontal axis between an upright position (FIGS. 3B/4B) and a rearwardly inclined position (FIG. 2B). A compression coil spring 238 acts upon the horizontal plate 232, at a position on the right hand side of the hinge 237, to resiliently bias the locking frame 230 towards the upright position. The horizontal plate 232 carries at its free end a soft iron disc 239 that is susceptible to magnetic attraction and is hinged for limited movement for self-alignment.

The solenoid 240 comprises a ferromagnetic shaft 241 that extends vertically, having upper and lower ends 242 and 243. The solenoid 240 includes a winding 244 disposed around the shaft 241, and an external ferromagnetic plate 245. The plate 245 extends from the upper end 242 of the shaft 241 and reaches near the lower end 243 to form a gap 246 therewith. The test button 130 is located above the solenoid 240. The disc 239 of the locking frame 230 is positioned immediately below the gap 246 for closing it when the locking frame 230 is pivoted to the upright position, thereby completing the magnetic path of the solenoid 240 when the latter is energised.

Figure 2A:
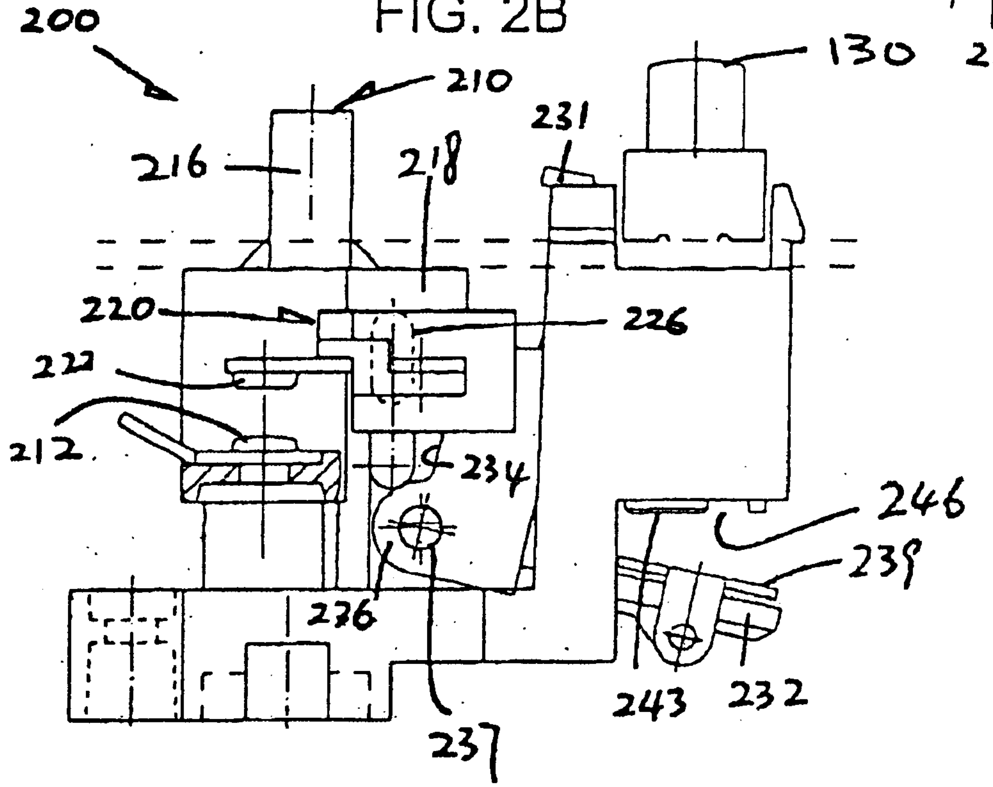

The operation of the circuit breaker 100 will now be described. In the initial or tripped condition (FIGS. 2A and 2B), both the actuator 210 and the contact holder 220 are in their upper positions under the action of the springs 214 and 224. While the contact holder 220 is in the upper position, its side knobs 226 stay out of the respective recesses 234 of the locking frame 230 and block against the corresponding upper protrusions 235, such that the locking frame 230 is pushed off into its inclined position against the action of the spring 238. While the contact holder 220 is in the upper position, its (upper) contacts 222 are spaced apart from the (lower) contacts 212 of the actuator 210, whereby the load is disconnected from the mains power supply.

Figure 3B:
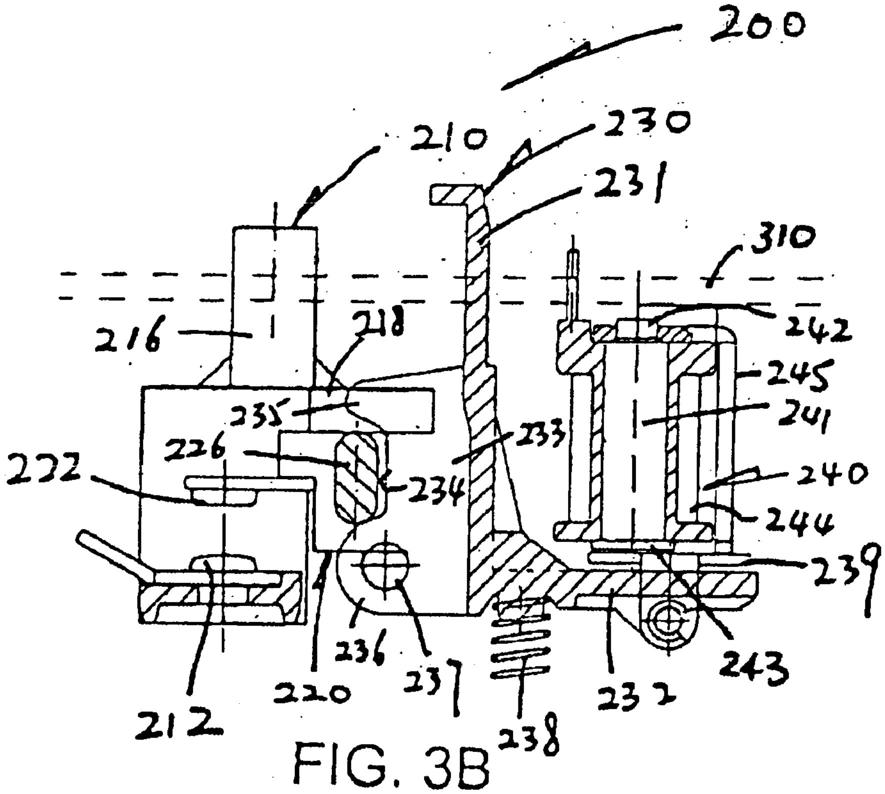
FIGS. 3A and 3B are a side view and a partially cross-sectioned side view corresponding to FIGS. 2A and 2B, showing the switching mechanism in a resetting condition.
Figure 3A:
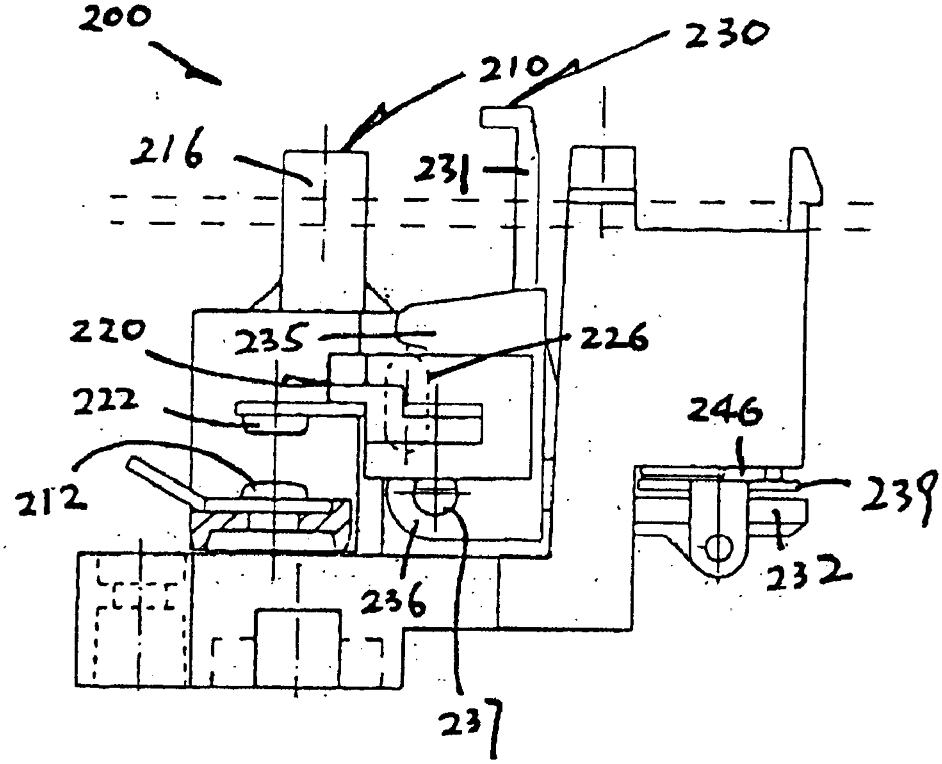

In the absence of a circuit fault at the load or after its clearance, the circuit breaker 100 can be reset by a user momentarily pressing the reset button 120, while the solenoid 240 is being energised. Upon depression of the reset button 120, the actuator 210 and in turn the contact holder 220 will both be moved downwards against the action of the springs 214 and 224. While the contact holder 220 is moving downwards, its side knobs 226 will enter into, from the upper sides of, the corresponding recesses 234 of the locking frame 230. As a result, the upper protrusions 235 become unblocked and the locking frame 230 is released to pivot to its upright position under the action of the spring 238 (FIGS. 3A and 3B).

Upon the locking frame 230 reaching the upright position, the self-aligning disc 239 comes into contact with the lower ends of the shaft 241 and plate 245 and closes the gap 246, thereby completing the magnetic path of the solenoid 240. By way of magnetic attraction, the disc 239 is held against the solenoid 240 and the locking frame 230 is in turn maintained in the upright position. While the locking frame 230 is upright, its recesses 234 entrap the corresponding side knobs 226 of the contact holder 220.

Figure 4B:
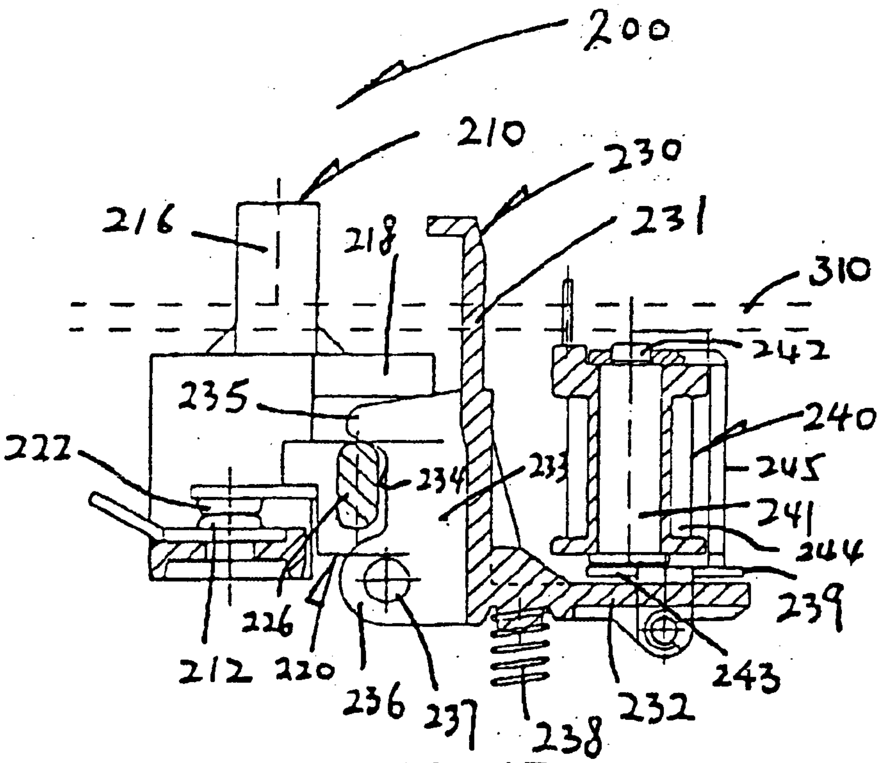
FIGS. 4A and 4B are a side view and a partially cross-sectioned side view corresponding to FIGS. 3A and 3B, showing the switching mechanism in a normal operating condition.
Figure 4A:
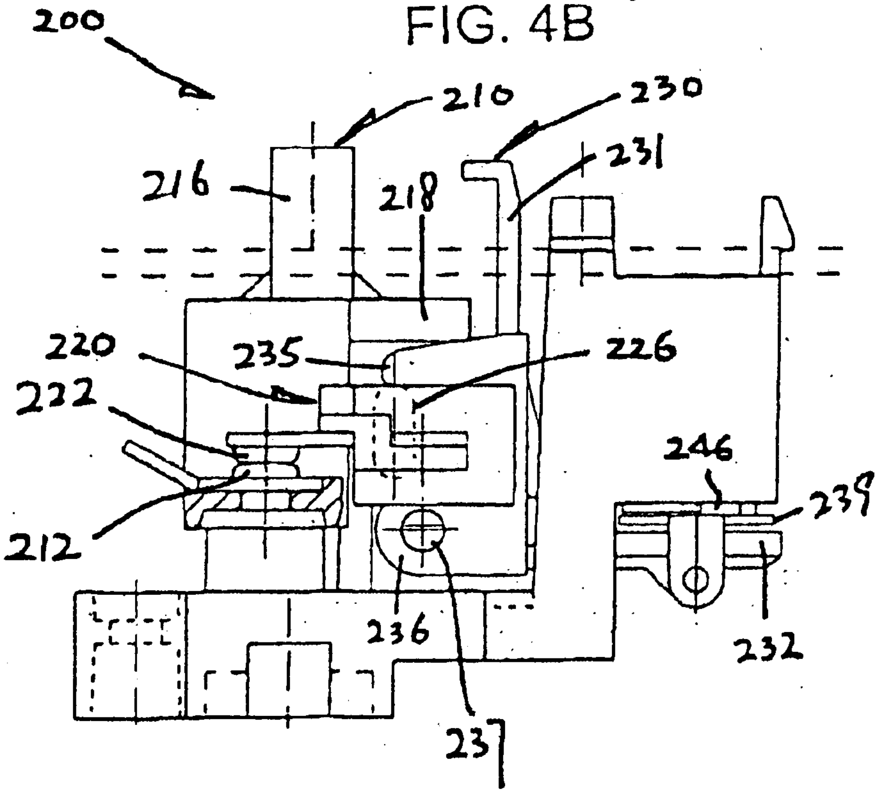
Figure 5:
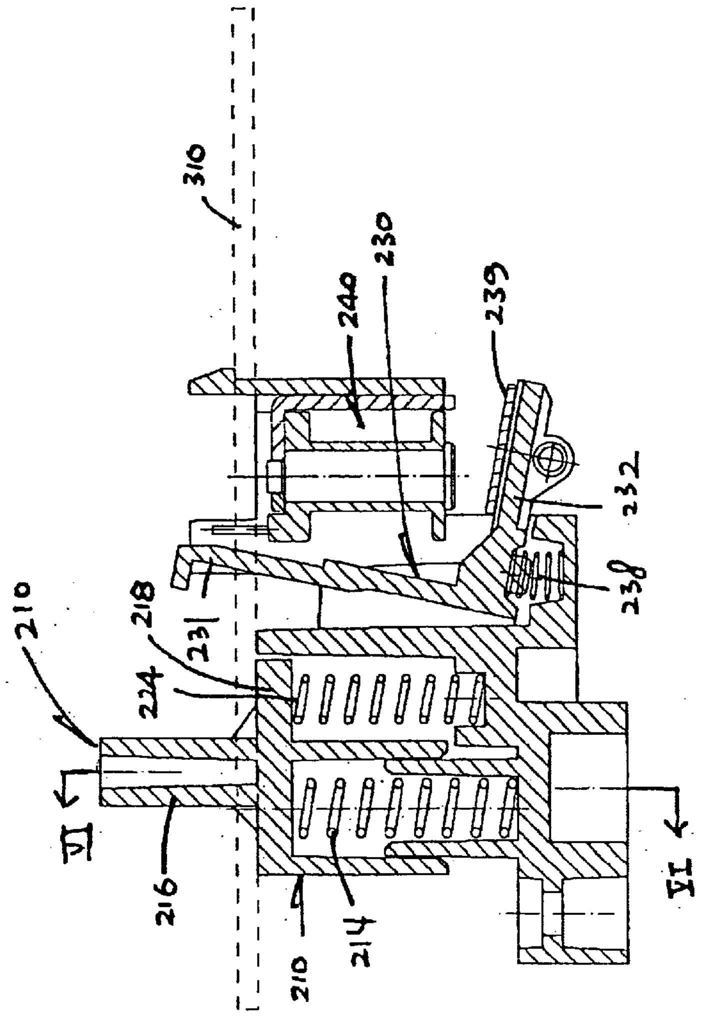
FIG. 5 is a cross-sectional side view of the operating mechanism of FIGS. 2A and 2B.
Figure 6:
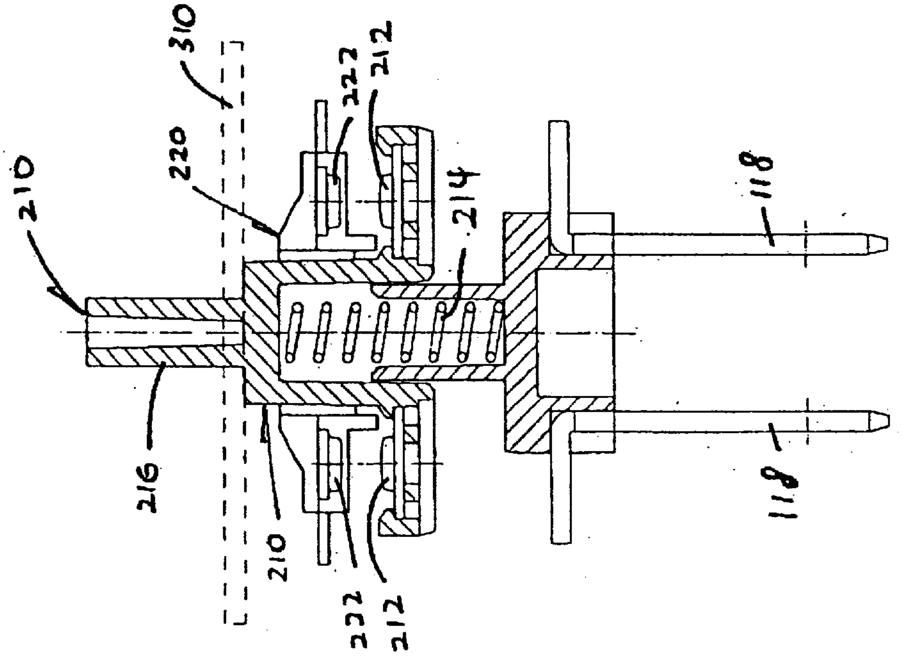
FIG. 6 is cross-sectional end view of the operating mechanism of FIG. 5, taken along line VI—VI. of FIG. 5.

The circuit breaker 100 will assume a normal operating condition immediately after the reset button 120 has been released (FIGS. 4A and 4B). Upon release of the reset button 120, both the actuator 210 and the contact holder 220 together will simultaneously, but only initially, move upwards under the action of the springs 214 and 224. As the side knobs 226 are trapped within the corresponding recesses 234 of the upright locking frame 230, the contact holder 220 can only move upwards for a limited short distance. As soon as the side knobs 226 hit and are detained by the corresponding upper protrusions 235, the contact holder 220 will be stopped at a specific (intermediate) position.

Compared with the initial condition of the circuit breaker 100 (FIGS. 2A and 2B), the upper contacts 222 are now located at a significantly lower position into the path of upward movement of the lower contacts 212. The actuator 210 will continue to move upwards carrying with it the lower contacts 212 until the lower contacts 212 hit and come into contact with the upper contacts 222, whereupon the live and neutral circuits for the load are both switched on.

Upon the detection of a circuit fault, the control circuit 300 instantly disables the operation of the solenoid 240, by de-energising it, whereupon the solenoid 240 releases the locking frame 230. Each upper protrusion 235 of the locking frame 230 has an outwardly inclined inner edge (as mentioned above), against which the corresponding side knob 226 of the contact holder 220 engages. In the absence of the holding force of the solenoid 240, the spring 238 alone is insufficiently strong to hold the locking frame 230 upright against the action of the spring 224, in that the spring 224 pushes the contact holder 220 upwards and hence the side knobs 226 which are urging against the inclined inner edges of the respective upper protrusions 235 of the locking frame 230.

As soon as the holding force of the solenoid 240 disappears, the contact holder 220 moves upwards under the action of its spring 224, thereby moving the upper contacts 222 beyond the path of upward movement of the lower contacts 212 of the actuator 210. Initially the lower contacts 212 will be moved simultaneously upwards by the spring 214, but as soon as the actuator 210 stops at its upper position, the upper contacts 222 will depart and separate from the corresponding lower contacts 212. The circuit breaker 100 then returns to the tripped condition (FIGS. 2A and 2B), in which both the live and the neutral circuits are switched off and the load is disconnected from the power source.

The invention has been given by way of example only, and various modifications of and/or alterations to the described embodiment may be made by persons skilled in the art without departing from the scope of the invention as specified in the appended claims.

What is claimed is:

1. A circuit breaker comprising:

a casing, at least first and second movable contacts inside the casing for electrical connection to a load and to a power source, respectively, and moving along respective first and second paths of movement, a movable contact holder holding the first movable contact, an actuator for moving the second movable contact along the second path of movement and into the first path of movement for contacting the first movable contact, first resilient means biasing the movable contact holder away from the second movable contact, a locking member for locking the movable contact holder and, in turn, the first movable contact, at a first position in the second path of movement of the second movable contact, against the biassing applied by the first resilient means, for contact by the second movable contact, the locking member moving between a first locking member position locking the movable contact holder in the first position, and a second locking member position releasing the movable contact holder from the first position, second resilient means biassing the locking member towards the first locking member position, an electromagnetic device for holding the locking member in the first locking member position against the biassing of the first resilient means, during operation of the electromagnetic device, and an electronic control circuit for detecting a circuit fault and, in response to a fault, disabling operation of the electromagnetic device, releasing the locking member to move to the second locking member position.

2. The circuit breaker as claimed in claim 1, wherein the first and second resilient means comprise first and second springs, respectively.

3. The circuit breaker as claimed in claim 1, including third resilient means biassing the actuator to move the second contact into contact with the first contact.

4. The circuit breaker as claimed in claim 3, wherein the actuator engages the movable contact holder in a first direction to limit movement of the contact holder by the first resilient means in a second direction, opposite the first direction, and to move the movable contact holder simultaneously in the first direction against the biassing of both the first and the third resilient means.

5. The circuit breaker as claimed in claim 1, wherein the first contact is carried by the movable contact holder.

6. The circuit breaker as claimed in claim 1, wherein the second contact is carried by the actuator.

7. The circuit breaker as claimed in claim 1, wherein the movable contact holder and the actuator are movable along substantially parallel axes, and the electromagnetic device has a central axis that is substantially parallel to the axes of the movable contact holder and the actuator.

8. The circuit breaker as claimed in claim 1, wherein the electromagnetic device comprises a solenoid and a ferromagnetic core and holds the locking member in the first position by magnetic attraction.

9. The circuit breaker as claimed in claim 1, wherein the locking member pivots and comprises a first planar member adjacent the movable contact holder and a second planar member adjacent the electromagnetic device, the first and second planar members being connected to each other and being substantially perpendicular to each other.

10. The circuit breaker as claimed in claim 9, wherein the movable contact holder includes a protrusion on a first side, and the first planar member includes a detent on the first side for engaging the protrusion and detaining the movable contact holder at the first position.

11. The circuit breaker as claimed in claim 9, wherein the second planar member has a free end supporting a member magnetically attracted by the electromagnetic device.

12. The circuit breaker as claimed in claim 1, including two first contacts and two second contacts, wherein each pair of contacts including one of the first contacts and one of the second contacts is located on respective first and second sides of the casing, for electrical connection of a live and neutral circuit to a load from a power source, respectively.

13. The circuit breaker as claimed in claim 1, wherein the casing is a power plug having power pins for insertion into a socket of the power source and including a rear opening for entrance of a power cord connected to a load.

14. A circuit breaker comprising:

a casing, at least first and second movable contacts inside the casing for electrical connection to a load and to a power source, respectively, a movable contact holder holding the first movable contact, a resiliently biassed actuator moving, against a resilience, both of the at least two contacts in a spaced apart relationship in a first direction and, subsequently moving, by the resilience, the second contact in a second direction, opposite the first direction, into contact with the first contact, a movable locking member for stopping movement of the first contact in the second direction for contacting the second contact, an electromagnetic device holding the movable locking member in a position stopping movement of the first contact in the second direction during operation of the electromagnetic device, and an electronic control circuit for detecting a circuit fault and, in response to a fault, disabling operation of the electromagnetic device, releasing the movable locking member.

* * * * *